United States Patent [19]
Fernandez Martinez

[11] Patent Number: 6,078,803
[45] Date of Patent: Jun. 20, 2000

[54] PERSONAL MULTIFUNCTION WRIST-DEVICE

[76] Inventor: Jose Ignacio Fernandez Martinez, Churruca, 8, Alicante 03003, Spain

[21] Appl. No.: 08/750,669

[22] PCT Filed: Apr. 12, 1996

[86] PCT No.: PCT/ES96/00084

§ 371 Date: Dec. 12, 1996

§ 102(e) Date: Dec. 12, 1996

[87] PCT Pub. No.: WO96/33569

PCT Pub. Date: Oct. 24, 1996

[30] Foreign Application Priority Data

Apr. 20, 1995 [ES] Spain ................................. 9501069 U

[51] Int. Cl.[7] ........................................................ H04B 1/08
[52] U.S. Cl. ............................ 455/349; 455/344; 455/90; 368/10
[58] Field of Search .............................. 379/58, 433, 428; 361/680; 364/705.02, 709.16; 455/90, 344, 349; 368/10, 13, 282; 224/165; 235/462.44

[56] References Cited

U.S. PATENT DOCUMENTS

| | | | |
|---|---|---|---|
| 4,586,827 | 5/1986 | Hirsch et al. ............................ | 368/282 |
| 4,746,043 | 5/1988 | Booker .................................... | 224/219 |
| 5,020,090 | 5/1991 | Morris ....................................... | 379/58 |
| 5,514,861 | 5/1996 | Swartz et al. ....................... | 235/462.44 |
| 5,615,259 | 3/1997 | Gilbert .................................... | 379/433 |
| 5,673,169 | 9/1997 | Wicks .................................... | 361/680 |

FOREIGN PATENT DOCUMENTS

| | | |
|---|---|---|
| 602828 A1 | 6/1994 | European Pat. Off. . |
| 7079278 | 3/1995 | Japan . |
| 0 602 828 A1 | 6/1994 | United Kingdom ............ H04M 1/20 |
| WO 91/07836 | 5/1991 | WIPO . |
| WO 93/16550 | 8/1993 | WIPO . |

OTHER PUBLICATIONS

Mastering Windows 3.1 by Robert Cowart from SYBEX Inc., Chapter 1, p. 17, 1992.
International Search Report for PCT/ES96/00084.

*Primary Examiner*—Lee Nguyen
*Assistant Examiner*—Isaak R. Jama
*Attorney, Agent, or Firm*—Ostrager Chong Flaherty & Onofrio, P.C.

[57] ABSTRACT

The invention discloses a wrist-device which comprises a first module (1) such as a personal computer and a second module (2) consisting of a mobile telephone or a wireless telephone terminal which are coupled by means of elements (15) in a bracelet configuration for holding the device to the forearm of the user, and wherein windows (12) are provided in said modules for the passage of electronic connection buses (13) between said modules (1 and 2).

8 Claims, 3 Drawing Sheets

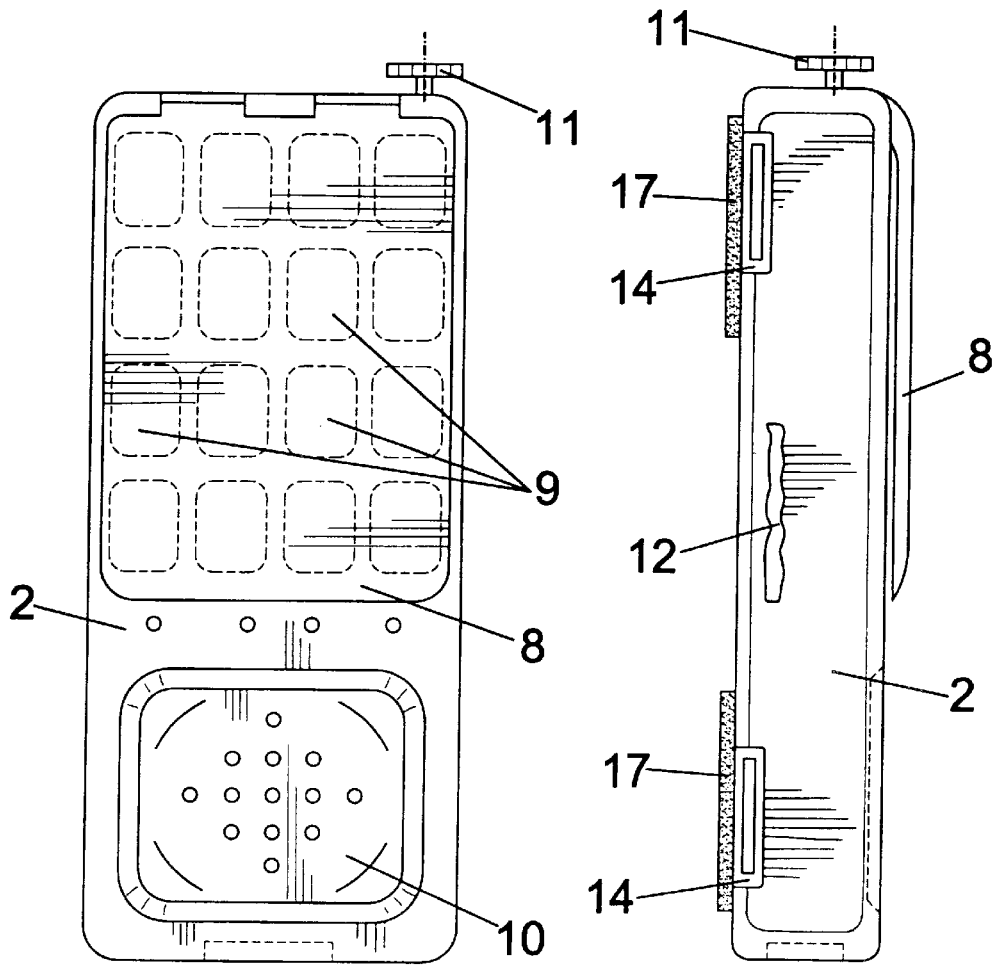
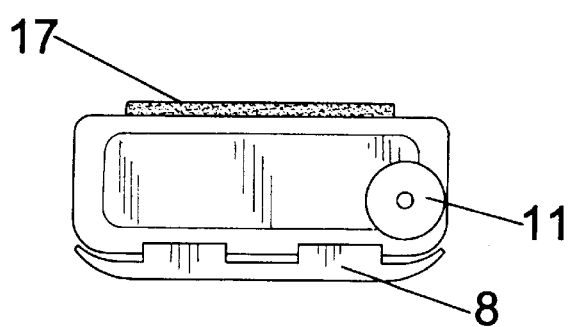
FIG. 5   FIG. 6
FIG. 7

PERSONAL MULTIFUNCTION WRIST-DEVICE

OBJECT OF THE INVENTION

The present invention, as expressed in the statement of this description, refers to a personal multifunction wrist-device, which is based on the combination of three elements of daily use, and which are necessary for specific persons, the elements of which are a watch, a personal computer and a mobile telephone or wireless telephone terminal.

These three elements are associated in such a manner that two of said elements form a single module, such as the watch and the personal computer, while the other, corresponding to the telephone or terminal, forms an independent module, though both modules may be associated and constitute in any of the cases, a wrist-device which is applicable on the forearm of the user so as to form a single assembly to be made use of at any moment and in any place, offering the user, simply and comfortably, any of the functions provided by these three elements.

BACKGROUND OF THE INVENTION

It is very common at present that specific persons necessarily use or require for their work, the use of a personal computer, of a mobile telephone and, of course, of a watch, the three elements of which are uncomfortable to carry continuously, especially since they form independent bodies.

In such circumstances, there are specific moments and places when the function or use of one of those elements is necessary, being sometimes impossible, since the user may have left the personal computer or even the mobile telephone in, for example, his own car or in the office, when he is meeting another person or is in a specific place, other than his car or his office.

DESCRIPTION OF THE INVENTION

The device of the invention may be said to constitute a personal multifunction wrist-device means which allows the user to carry permanently with him the personal computer, the watch and the telephone or the telephone terminal, and to make use of any of the same when and where required.

In this sense, the device of the invention is based on the combination of the three previously referred elements, which form an assembly which in bracelet configuration is placed on the forearm/wrist of the user, the module which forms the computer together with its display remaining on the upper part, including the watch, and the module which forms the telephone, remaining on the lower side, all the above in such a way that the display of the computer visualizes, not only the functions of the same, but also that of the watch, which shall be digital, as well as those of the actual telephone or terminal.

These two modules which comprise the computer/watch and the actual telephone, may be coupled to the forearm/wrist of the user by means of any conventional system, as may be a chain, wristband, strap, clip, etc., the corresponding electronic connection existing between them, based, for example, on connection buses, which may be established through the actual said coupling means or else form electronic connection elements independent from the coupling means between the two said modules.

These modules, in correspondence with the side abutted on the forearm/wrist of the user, shall be equipped with elements, such as a rubber or latex layer which prevents the friction against the forearm/wrist of the user, of the hard bodies which constitute the previously indicated modules, that is to say, flexible abuttment means and with smooth contact for a maximum comfort to the user.

As has been previously stated, the module which constitutes the computer/watch, comprises the corresponding display for visualizing the data offered by the computer and even the digital indicators of the hours, as well as specific functions of the actual telephone or of the telephone terminal, including, the module of the same, a folding flap with incorporated receiver, said folding flap covering the zone of the keyboard, also including an adaptor for the receivers.

The fact must be pointed out that as regards the functions of these elements, the telephone or terminal must have capabilities for increasing the functions must be pointed out, whilst the computer is equipped with a multiprogramme of selective functions in which the function of the watch may be an alarm, a warning device and a chronometer, while it may equally have the function of electronic agenda and calender, as well as a function of basic calculator and any specific professional function in compliance with the included programme.

BRIEF DESCRIPTION OF THE DRAWINGS

To complement the description herewith offered and in order to make more comprehensible the characteristics of the invention, a set of drawings are herewith attached to this present description, based on which the innovations and advantages of the personal multifunction wrist-device, which is the object of the invention, are more easily comprehensible.

FIGS. 5, 6 and 7 show other such plan, longitudinal elevation, and side elevation views of the module which constitutes the mobile telephone or wireless telephone terminal.

DESCRIPTION OF THE PREFERRED EMBODIMENT

Figure 1:
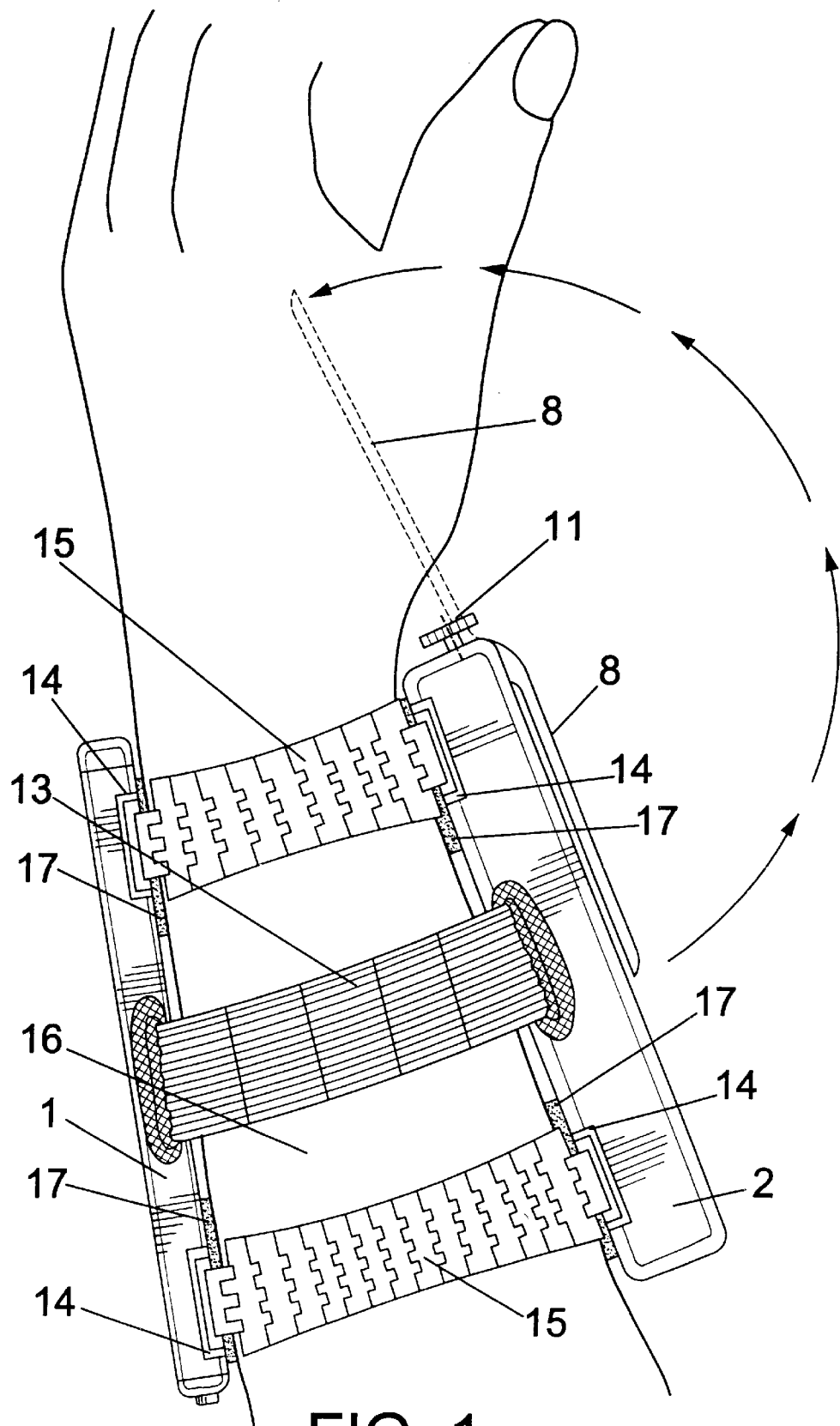
FIG. 1 shows a general perspective view of the device applied on the forearm/wrist of the user, the two modules of the device being coupled by means of a type of bracelet configuration, and electronically connected by means of connection buses.
Figure 2:
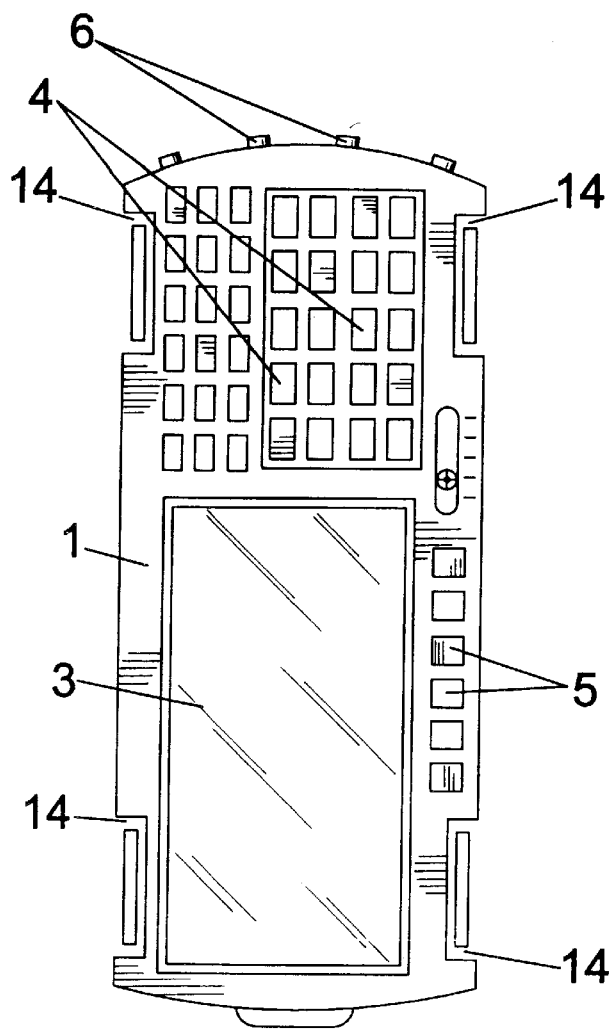
FIGS. 2, 3 and 4 show other such plan, longitudinal elevation and side elevation views, respectively, of the modules which constitute the computer/watch with the multifunction display.
Figure 3:
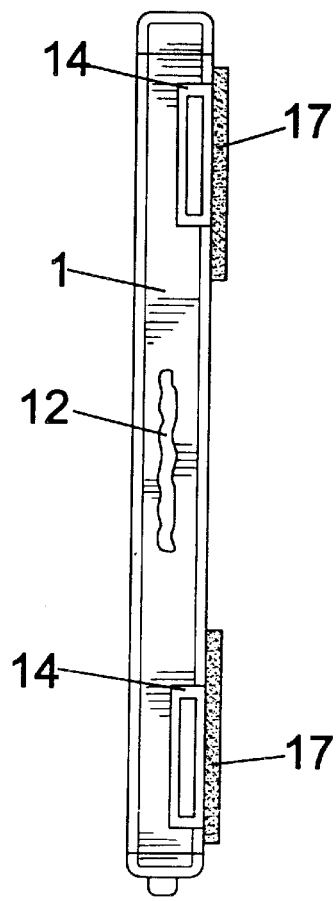
Figure 4:
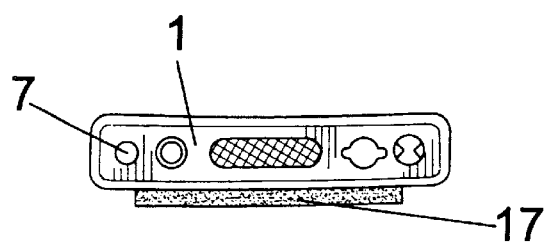

In view of said figures, it may be observed how the device of the invention is basically constituted by means of two elements or modules 1 and 2, the former of which corresponds to a computer/watch with display 3, numerical keyboard 4, keys 5 for the corresponding functions and pushbutton 6, also for specific watch functions, also including an adaptor 7 for receivers.

On its part, module 2 corresponds to a telephone or terminal and even to a folding flap 8 which covers the corresponding keyboard 9, in such a manner that the face on which the same is provided, and independent to the folding flap 8, it includes the corresponding screen 10 for talking, and hidden on the folding flap 8, the receivers, being complemented with an extendible antenna 11 on one of the lateral sides.

Both the body or module 1, as well as the body or module 2, are equipped with a window 12 for the passage of an electronic connection bus 13, which, as its own name indicates, connects both modules or elements 1 and 2 to permit the visualization of the data of the mobile telephone or of the telephone terminal 2 on the actual display 3 of body 1 on the computer.

Additionally, said two bodies or modules 1 and 2 are provided with passages 14 for coupling and attachment means 15 of both bodies or modules 1 and 2, encircling the forearm/wrist 16 of the user.

That is to say, that said elements or modules 1 and 2 which comprise the computer/watch and the telephone or terminal, may be coupled both mechanically, through the elements 15, encircling the forearm/wrist 16 of the user, and, additionally, be electronically connected through a connection bus 13 or like system.

So that the abuttment of said modules 1 and 2 on the forearm/wrist 16 of the user does not constitute any type of discomfort or injury to the same, there is provided on the actual abuttment sides of said modules 1 and 2, respective elements 17 which are flexible and at the same time soft to the touch, said abuttment elements 17 capable of being constituted of rubber, latex or like material.

Thus is achieved the union in one single assembly, of the elements which are necessary for daily use of specific persons, and said elements being a watch, a personal computer and a mobile telephone or a wireless telephone terminal, with the particularity that said assembly remains perfectly attached, and visually and manually available to the actual user since it is placed and attached on the forearm/wrist of the same.

What is claimed is:

1. PERSONAL MULTIFUNCTION WRIST-DEVICE, having a first module (1) which comprises a personal computer with a watch and a second module which comprises a mobile telephone or a wireless telephone terminal for its joint coupling on the user's forearm/wrist (16), characterized in that mounting means (15) are provided with the shape of a bracelet for mounting said first module (1) and said second module (2) in such a way that said first module is positioned on the upper part and said second module is positioned on the lower part when the bracelet (15) is disposed upon the user's wrist (16), and wherein on the first module (1) and on the second module (2) are provided passing openings (12) for electronic buses (13) for connecting the two modules (1, 2), and further characterized in that the first module (1) includes a visualization display (3), a keyboard (4) for functions, keys and pushbuttons (5 and 6) for other functions, and an adapter (7) for telephone ear-piece receivers, and said visualization display (3) is connected so as to achieve the presentation, both of the computer data and of the mobile telephone or wireless telephone terminal data.

2. PERSONAL MULTIFUNCTION WRIST-DEVICE, according to claim 1, of the type in which the second module (2) which constitutes the mobile telephone or wireless telephone terminal, includes a folding flap (8), said flap for covering the corresponding keyboard (9) and including a telephone ear-piece receiver, said second module being further equipped with the corresponding screen (10) for talking (microphone not shown) and with an extendible antenna (11), characterized in that said flap (8) with incorporated telephone ear-piece receiver is placed and spaced so as to make possible the correct use of the mobile telephone or wireless telephone terminal without requiring the separation of the device from the wrist of the user.

3. PERSONAL MULTIFUNCTION WRIST-DEVICE, according to claim 1, characterized in that both the computer/watch (1) module and the mobile telephone or the wireless telephone terminal module (2) are equipped with passages (14) for the coupling and attachment (15) of both modules (1 and 2) on the forearm/wrist (16) of the user.

4. PERSONAL MULTIFUNCTION WRIST-DEVICE, according to claim 1, characterized in that on the abutment side of modules (1 and 2) on the forearm/wrist (16) of the user, flexible elements, smooth to the touch (17), are provided, through which, the actual abutment on said forearm/wrist (16) of the user is determined.

5. PERSONAL MULTIFUNCTION WRIST-DEVICE, having a first module (1) which comprises a personal computer with a watch and a second module which comprises a mobile telephone or a wireless telephone terminal for its joint coupling on the user's forearm/wrist (16), characterized in that mounting means (15) are provided with the shape of a bracelet for mounting said first module (1) and said second module (2) in such a way that said first module is positioned on the upper part and said second module is positioned on the lower part when the bracelet (15) is disposed upon the user's wrist (16), and wherein on the first module (1) and on the second module (2) are provided passing openings (12) for electronic buses (13) for connecting the two modules (1, 2), and wherein said second module is placed so as to make possible the correct use of the mobile telephone or wireless telephone terminal without requiring the separation of the device from the wrist of the user, and wherein said computer module includes a visualization display (3) which is connected so as to achieve the presentation, both of the computer data and of the mobile telephone or wireless telephone terminal, wherein the first module (1) includes a keyboard (4) for functions, keys and pushbuttons (5 and 6) for other functions, and an adapter (7) for telephone ear-piece receivers.

6. PERSONAL MULTIFUNCTION WRIST-DEVICE, according to claim 5, of the type in which the second module (2) which constitutes the mobile telephone or wireless telephone terminal, includes a folding flap (8), said flap for covering the corresponding keyboard (9) and including a telephone ear-piece receiver, said second module being further equipped with the corresponding screen (10) for talking (microphone not shown) and with an extendible antenna (11).

7. PERSONAL MULTIFUNCTION WRIST-DEVICE, according to claim 5, characterized in that both the computer/watch (1) module and the mobile telephone or the wireless telephone terminal module (2) are equipped with passages (14) for the coupling and attachment (15) of both modules (1 and 2) on the forearm/wrist (16) of the user.

8. PERSONAL MULTIFUNCTION WRIST-DEVICE, according to claim 5, characterized in that on the abutment side of modules (1 and 2) on the forearm/wrist (16) of the user, flexible elements, smooth to the touch (17), are provided, through which, the actual abutment on said forearm/wrist (16) of the user is determined.

* * * * *